(12) United States Patent
Feng et al.

(10) Patent No.: US 10,509,874 B2
(45) Date of Patent: Dec. 17, 2019

(54) METHOD AND DEVICE FOR FORECASTING THERMAL RUNAWAY SAFETY OF POWER BATTERY, AND A METHOD FOR MAKING POWER BATTERY

(71) Applicant: Tsinghua University, Beijing (CN)

(72) Inventors: Xu-Ning Feng, Beijing (CN); Si-Qi Zheng, Beijing (CN); Xiang-Ming He, Beijing (CN); Li Wang, Beijing (CN); Ming-Gao Ouyang, Beijing (CN); Dong-Sheng Ren, Beijing (CN); Lan-Guang Lu, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 16/122,892

(22) Filed: Sep. 6, 2018

(65) Prior Publication Data
US 2019/0243931 A1    Aug. 8, 2019

(51) Int. Cl.
*G06F 17/50* (2006.01)
*G01K 17/00* (2006.01)
*H01M 10/48* (2006.01)

(52) U.S. Cl.
CPC ......... *G06F 17/5009* (2013.01); *G01K 17/00* (2013.01); *H01M 10/48* (2013.01); *G06F 2217/16* (2013.01)

(58) Field of Classification Search
CPC ............ G06F 17/5009; G06F 2217/16; H01M 10/48; G01K 17/00
See application file for complete search history.

(56) References Cited

U.S. PATENT DOCUMENTS

| 8,346,495 B2 * | 1/2013 | Gering .................. | H01M 10/48 |
| | | | 702/63 |
| 2017/0084969 A1 * | 3/2017 | Choi ..................... | H01M 10/48 |

FOREIGN PATENT DOCUMENTS

CN        104346524 B        2/2015

OTHER PUBLICATIONS

Feng et al., "Thermal runaway propagation model for designing a safer battery pack with 25 Ah LiNixCoyMnzO2 large format lithium ion battery," Applied Energy 154, pp. 74-91 (2015) (Year: 2015).*

(Continued)

*Primary Examiner* — Rehana Perveen
*Assistant Examiner* — Steven W Crabb

(57) ABSTRACT

A method for forecasting thermal runaway safety of a full battery by a computer is provided and including receiving a self heat generation onset temperature $T_0$ of a first power battery, wherein the first power battery is a half cell; calculating a maximum temperature $T_{max}$ of thermal runaway of the first power battery based on a thermal runaway reaction kinetic model stored in the computer, calculating a maximum temperature rise $\Delta T$ by making difference between the maximum temperature $T_{max}$ and the self heat generation onset temperature $T_0$; and judging the thermal runaway safety of the first power battery by the relationship between the self heat generation onset temperature $T_0$ and the maximum temperature rise $\Delta T$.

20 Claims, 9 Drawing Sheets

(56) References Cited

OTHER PUBLICATIONS

Melcher, Andreas et al., "Modeling and Simulation of the Thermal Runaway in Cylindrical 18650 Lithium-Ion Batteries," Proceedings of the 2016 COMSOL Conference, pp. 1-7 (2016) (Year: 2016).*
Dubarry, Matthieu et al., "From Li-ion single cell model to battery pack simulation," 17th IEEE International Conference on Control Applications, pp. 708-713 (Year: 2008).*
Chen, Man et al., "A Thermal Runaway Simulation on a Lithium Titanate Battery and the Battery Module," Energies Journal, pp. 1-15 (Year: 2015).*
Ping et al., "Modelling electro-thermal response of lithium-ion batteries from normal to abuse conditions," Applied Energy 205 pp. 1327-1344 (Year: 2017).*

* cited by examiner

US 10,509,874 B2

METHOD AND DEVICE FOR FORECASTING THERMAL RUNAWAY SAFETY OF POWER BATTERY, AND A METHOD FOR MAKING POWER BATTERY

CROSS-REFERENCE TO RELATED APPLICATIONS

This application claims all benefits accruing under 35 U.S.C. § 119 from China Patent Applications No. 201810122869.1, filed on Feb. 7, 2018 in the China Intellectual Property Office, the content of which is hereby incorporated by reference.

FIELD

The present disclosure relates to battery technology and, particularly, to a method and a device for forecasting thermal runaway safety of a battery.

BACKGROUND

Electric vehicles are widely used new-energy vehicles, with a battery as the core energy source of the electric vehicle. A lithium-ion battery (hereinafter referred to as "power battery") is an important power source for the electric vehicle because of its energy density and cycle life. Because of the limited vehicle space, in order to increase the endurance mileage of the electric vehicle, more of the power battery is needed within the limited vehicle space, and the specific energy of the power battery must be improved. In traffic accidents, the thermal runaway energy released by a power battery with high specific energy is more concentrated. Thus, it is necessary to consider the thermal runaway safety of the power battery with high specific energy when designing the power battery with high specific energy.

Currently, in safety designs, the thermal stability test of the material, the thermal stability test of the electrode plates, and the thermal runaway property test of the full or complete battery are generally carried out. However, the thermal stability tests of materials and electrode plates usually can only be used for qualitative analysis and cannot directly reflect the thermal runaway property of the full battery. Thus, in the safety design of the power battery, it is necessary to assemble the full battery before carrying out the thermal runaway property experiment, so as to accurately judge the thermal runaway safety of the power battery.

In Chinese patent application number 201410470610.8, a modeling method for the thermal runaway of lithium ion batteries aims to provide an important basis for extending the application range of lithium ion batteries in extreme, high temperature conditions. The reaction kinetic parameters must be calibrated by the thermal runaway data of the cells. This reverse calibration method, however, needs a full battery experiment. In the safety design of the power battery, it cannot effectively reduce the amount of experiments and improve the efficiency of research and development.

What is needed, therefore, is to provide a method and a device for forecasting thermal runaway safety of a full battery.

BRIEF DESCRIPTION OF THE DRAWINGS

Implementations are described by way of example only with reference to the attached figures.

SUMMARY

Figure 1:
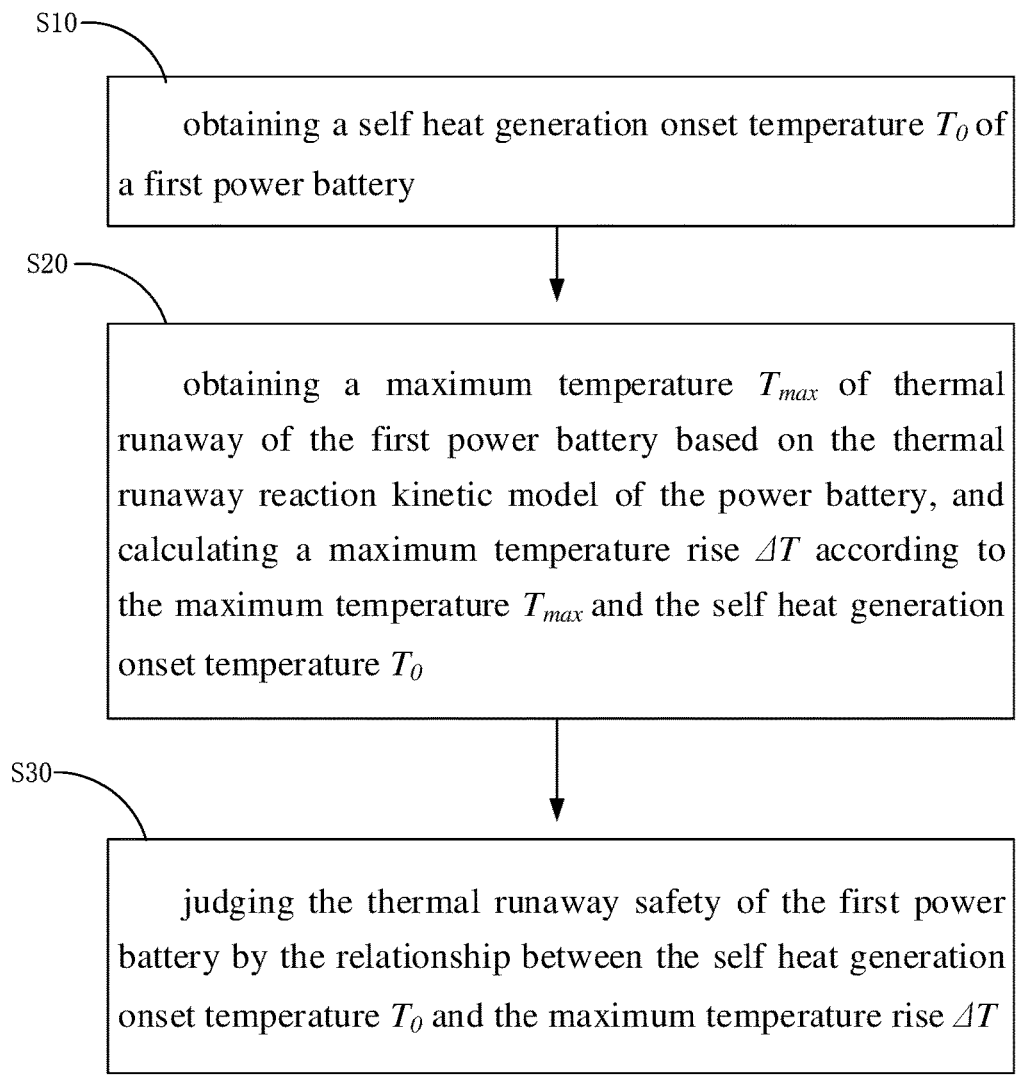
FIG. 1 is a flow chart of one embodiment of a method for forecasting thermal runaway safety of a full battery.

In one embodiment, a method for forecasting thermal runaway safety of a full or complete battery by a computer is provided. The computer can be a data processing system comprising a processor and a memory coupled to the processor to store instructions, which when executed by the processor, cause the processor to perform operations for forecasting the thermal runaway safety of the full battery. The method includes:

receiving a self heat generation onset temperature $T_0$ of a first power battery, wherein the first power battery is a half cell;

calculating a maximum temperature $T_{max}$ of thermal runaway of the first power battery based on a thermal runaway reaction kinetic model stored in the computer, wherein the thermal runaway reaction kinetic model satisfies a first formula:

$$T = \int_t \frac{dT}{dt} dt + T_0$$

wherein T represents a temperature of a second power battery, $T_0$ represents a self heat generation onset temperature of the second power battery, $T_0$ is equal to a minimum of onset temperatures $T_{onset,x}$ of all the thermal runaway reactions, and $$\frac{dT}{dt}$$

represents a temperature rise rate of the second power battery;

calculating a maximum temperature rise $\Delta T$ by making the difference between the maximum temperature $T_{max}$ and the self heat generation onset temperature $T_0$; and determining the thermal runaway safety of the first power battery by the relationship between the self heat generation onset temperature $T_0$ and the maximum temperature rise $\Delta T$.

In one embodiment, a data processing system, comprising:

a processor; and a memory coupled to the processor to store instructions, which when executed by the processor, cause the processor to perform operations for forecasting thermal runaway safety of a full battery, the operations including:

receiving a self heat generation onset temperature $T_0$ of a first power battery, wherein the first power battery is a half cell;

storing a thermal runaway reaction kinetic model, wherein the thermal runaway reaction kinetic model satisfies a first formula:

$$T = \int_t \frac{dT}{dt} dt + T_0$$

wherein T represents a temperature of the second power battery, $T_0$ represents a self heat generation onset temperature of the second power battery, $T_0$ is equal to a minimum of onset temperatures $T_{onset,x}$ of all the thermal runaway reactions, and $$\frac{dT}{dt}$$

represents a temperature rise rate of the second power battery;

calculating a maximum temperature $T_{max}$ of thermal runaway of the first power battery based on the thermal runaway reaction kinetic model and the maximum temperature rise $\Delta T$;

obtaining a forecasted result by comparing the maximum temperature $T_{max}$ with a threshold temperature $T_{threshold}$, or selecting the minimum from a plurality of maximum temperature rise $\Delta T$ of a plurality of first power batteries; and outputting the forecasted result to a user.

In one embodiment, a computer device for forecasting thermal runaway safety of a full or complete battery includes:

a receiving module configured to receive a self heat generation onset temperature $T_0$ of a first power battery, wherein the first power battery is a half cell;

a storing module configured to store a thermal runaway reaction kinetic model, wherein the thermal runaway reaction kinetic model satisfies a first formula:

$$T = \int_t \frac{dT}{dt} dt + T_0$$

wherein T represents a temperature of the second power battery, $T_0$ represents a self heat generation onset temperature of the second power battery, $T_0$ is equal to a minimum of onset temperatures $T_{onset,x}$ of all the thermal runaway reactions, and $$\frac{dT}{dt}$$

represents a temperature rise rate of the second power battery;

a calculating module configured to calculate a maximum temperature $T_{max}$ of thermal runaway of the first power battery based on the thermal runaway reaction kinetic model and calculate the maximum temperature rise $\Delta T$;

a judging or determining module configured to obtain a forecasted result by comparing the maximum temperature $T_{max}$ with a threshold temperature, or selecting the minimum of a plurality of maximum temperature rise $\Delta T$ of a plurality of first power batteries; and an outputting module configured to show the forecasted result to a user.

In one embodiment, a method for making a full or complete battery is provided and including:

providing a first power battery, wherein the first power battery is a half cell;

obtaining a self heat generation onset temperature $T_0$ of the first power battery;

calculating a maximum temperature $T_{max}$ of thermal runaway of the first power battery based on a thermal runaway reaction kinetic model by a computer, wherein the thermal runaway reaction kinetic model satisfies a first formula:

$$T = \int_t \frac{dT}{dt} dt + T_0$$

wherein T represents a temperature of the second power battery, $T_0$ represents a self heat generation onset temperature of the second power battery, $T_0$ is equal to a minimum of onset temperatures $T_{onset,x}$ of all the thermal runaway reactions, and $$\frac{dT}{dt}$$

represents a temperature rise rate of the second power battery;

judging or determining the thermal runaway safety of the first power battery by comparing the maximum temperature $T_{max}$ of thermal runaway of the first power battery with a threshold temperature $T_{threshold}$; and when the maximum temperature $T_{max}$ is less than or equal to the threshold temperature $T_{threshold}$, making a full battery according to the first power battery.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. Some or all of the modules described herein may be implemented as software, hardware, or a combination thereof modules and may be stored in any type of computer-readable medium or other storage device. For example, these modules may be installed in a persistent storage device, loaded into a memory, and executed by one or more processors. The memory may store information including sequences of instructions that are executed by a processor, or any other device.

Referring to FIG. 1, one embodiment of a method for forecasting thermal runaway safety of a full battery is disclosed. The method includes:

step S10, obtaining a self heat generation onset temperature $T_0$ of a first power battery;

step S20, obtaining a maximum temperature $T_{max}$ of thermal runaway of the first power battery based on the thermal runaway reaction kinetic model of the power battery, and calculating a maximum temperature rise $\Delta T$ according to the maximum temperature $T_{max}$ and the self heat generation onset temperature $T_0$; and step S30, judging the thermal runaway safety of the first power battery by the relationship between the self heat generation onset temperature $T_0$ and the maximum temperature rise $\Delta T$.

In step S10, the first power battery can be a half cell which is used to make a full battery. Each of the plurality of first power batteries includes a plurality of first component materials, and the plurality of first component materials can be a cathode electrode plate, an anode electrode plate, a separator, and an electrolyte. The self heat generation onset temperature $T_0$ of the first power battery may be different when the materials used for making the first power battery are different. The self heat generation onset temperature $T_0$ of the first power battery can be the lowest temperature of the thermal runaway reaction of the first power battery.

For example, the first power battery can have a plurality of thermal runaway reactions during the thermal runaway. The thermal runaway reaction can be a solid electrolyte interface film decomposition reaction, a reaction between the anode electrode and the electrolyte of the second power battery, an anode solid electrolyte interface film regenerating reaction of the second power battery, an anode electrode complete decomposition reaction of the second power battery, an cathode electrode first decomposition reaction of the second power battery, an cathode electrode second decomposition reaction of the second power battery, a separator melting reaction of the second power battery, an electrolyte decomposition reaction of the second power battery, and the cathode electrode and the anode electrode mixed contact reaction of the second power battery. Each of the plurality of thermal runaway reactions has a lowest or minimum temperature reached, thus, the first power battery can have a plurality of lowest temperatures. In one embodiment, the minimum or lowest of the plurality of lowest temperatures is used as the self heat generation onset temperature $T_0$ of thermal runaway of the first power battery.

In one embodiment, the self heat generation onset temperature $T_0$ of the first power battery can be obtained by testing the plurality of first component materials. In one embodiment, the self heat generation onset temperature $T_0$ of the first power battery can be obtained by look-up tables according to the material of the plurality of first component materials.

In step S20, the maximum temperature $T_{max}$ of thermal runaway of the first power battery can be the highest or maximum temperature reached of the thermal runaway reaction of the first power battery. The first power battery can have a plurality of thermal runaway reactions during the thermal runaway. Each of the plurality of thermal runaway reactions has a highest temperature, thus, the first power battery can have a plurality of highest temperatures. In one embodiment, the maximum or highest of the plurality of highest temperatures is used as the maximum temperature $T_{max}$ of thermal runaway of the first power battery.

The self heat generation onset temperature $T_0$ and the maximum temperature $T_{max}$ of the first power battery may be different when the materials used for making the first power battery are different. Also, the thermal runaway reaction of the first power battery, which can cause the maximum temperature $T_{max}$, may be different when the materials used for making the first power battery are different. The self heat generation onset temperature $T_0$ should be judged according to the first power battery and the thermal runaway reaction kinetic model of the power battery. The thermal runaway reaction, which can cause the maximum temperature $T_{max}$, should also be judged according to the first power battery and the thermal runaway reaction kinetic model of the power battery. In one embodiment, the maximum temperature $T_{max}$ can be the highest temperature of the anode electrode complete decomposition reaction of the first power battery. In one embodiment, the maximum temperature $T_{max}$ can be the highest temperature of the separator melting reaction of the first power battery. The maximum temperature rise $\Delta T$ is the difference between the maximum temperature $T_{max}$ and the self heat generation onset temperature $T_0$.

In step S30, when the self heat generation onset temperature $T_0$ is a constant, the smaller the maximum temperature rise $\Delta T$ or the maximum temperature $T_{max}$ of the first power battery based on the thermal runaway reaction kinetic model of the power battery, the better the thermal runaway safety of the full battery produced according to the first power battery. In one embodiment, the thermal runaway safety of the full battery is judged by comparing the maximum temperature $T_{max}$ with a threshold temperature $T_{threshold}$. The threshold temperature can be selected according to the temperature resistant property of the materials used to make the full battery. The threshold temperature is less than or equal to the lowest temperature that the materials used to make the full battery can bear. The threshold temperature can be in a range from about 400° C. to about 600° C. In one embodiment, the threshold temperature is about 500° C.

The method for forecasting thermal runaway safety of the power battery is simple and effective. In the process of thermal runaway reaction, the first power battery may generate a certain amount of heat. When the self heat generation onset temperature $T_0$ is a constant, the lower the thermal runaway temperature of the first power battery, the better the thermal runaway safety of the full battery. The maximum temperature $T_{max}$ of the first power battery is obtained according to the thermal runaway reaction kinetic model of the power battery. The maximum temperature rise $\Delta T$ is calculated according to the maximum temperature $T_{max}$ and the self heat generation onset temperature $T_0$. Since the first power battery is a half cell, the method provided by this disclosure can forecast the thermal runaway safety of the full battery without preparing a full battery.

Figure 2:
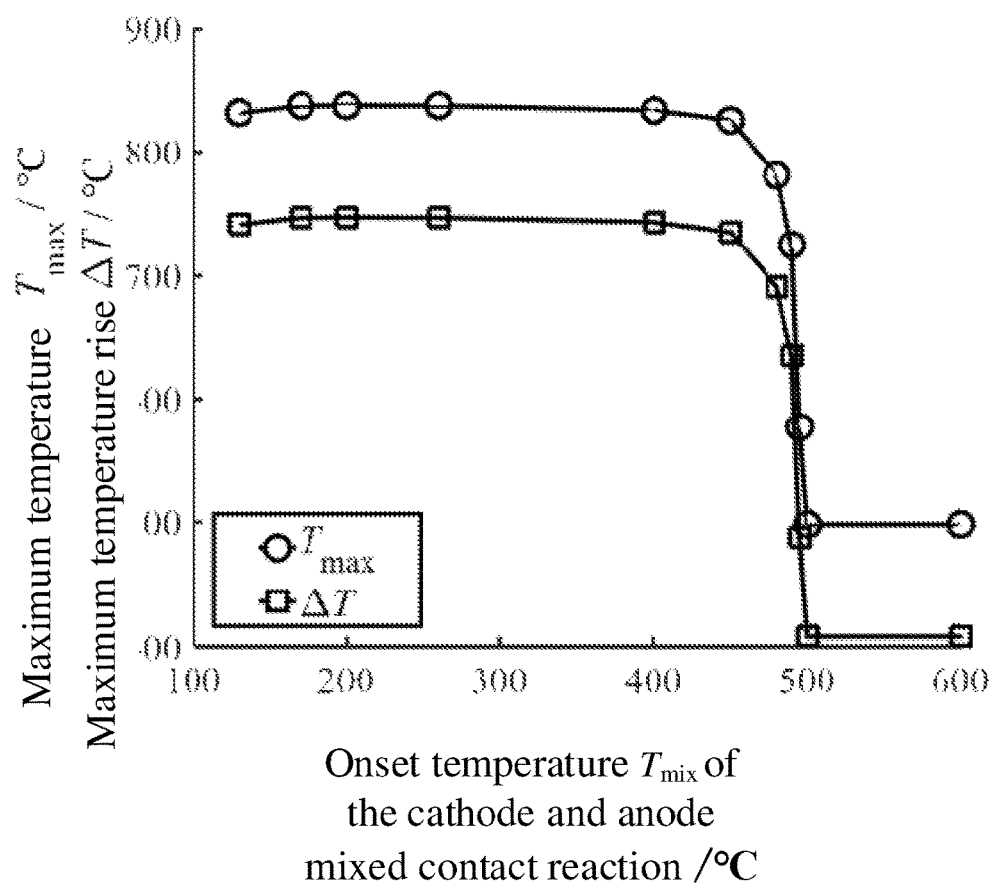
FIG. 2 shows a relationship between a self heat generation onset temperature of a first power battery and a maximum temperature rise of the first power battery based on the thermal runaway reaction kinetic model of the power battery.

In one embodiment, the onset temperature $T_{mix}$ of the cathode electrode and anode electrode mixed contact reaction of the first power battery is used as the self heat generation onset temperature $T_0$. FIG. 2 shows a relationship between the onset temperature $T_{mix}$ of the cathode electrode and anode electrode mixed contact reaction and both the maximum temperature $T_{max}$ and the maximum temperature rise $\Delta T$ of the first power battery. When the materials used for making the first power battery are known, the onset temperature $T_{mix}$ of the cathode electrode and anode electrode mixed contact reaction can be obtained. From FIG. 2, it can be seen that when the onset temperature $T_{mix}$ of the cathode electrode and anode electrode mixed contact reaction is below 480° C., the maximum temperature $T_{max}$ of the first power battery is substantially constant and in a range from about 820° C. to about 840° C., and the maximum temperature rise $\Delta T$ of the first power battery is also substantially constant and in a range from about 730° C. to about 750° C. However, when the onset temperature $T_{mix}$ of the cathode electrode and anode electrode mixed contact reaction is above 480° C., the maximum temperature $T_{max}$ of the first power battery suddenly falls and is stable at about 500° C., and the maximum temperature rise $\Delta T$ of the first power battery also suddenly falls and is stable at about 410° C. Thus, in order to essentially improve the thermal runaway safety of the first power battery and reduce the maximum temperature rise $\Delta T$ of the first power battery, it is necessary to control the onset temperature $T_{mix}$ of the cathode electrode and anode electrode mixed contact reaction of the first power battery to be above 480° C.

The method provided by this disclosure can forecast the thermal runaway safety of the full battery without preparing a full battery. The method for forecasting the thermal runaway safety of the power battery can simplify the conventional safety design process of the power battery by omitting the step of assembling the full battery. Thus, the research and development cycle of the power battery is shortened, the design and development cost is reduced, and the design and development efficiency is improved. The method for forecasting the thermal runaway safety of the power battery is beneficial to the safety design of the power battery in the process of power battery research, development and manufacture.

Figure 6:
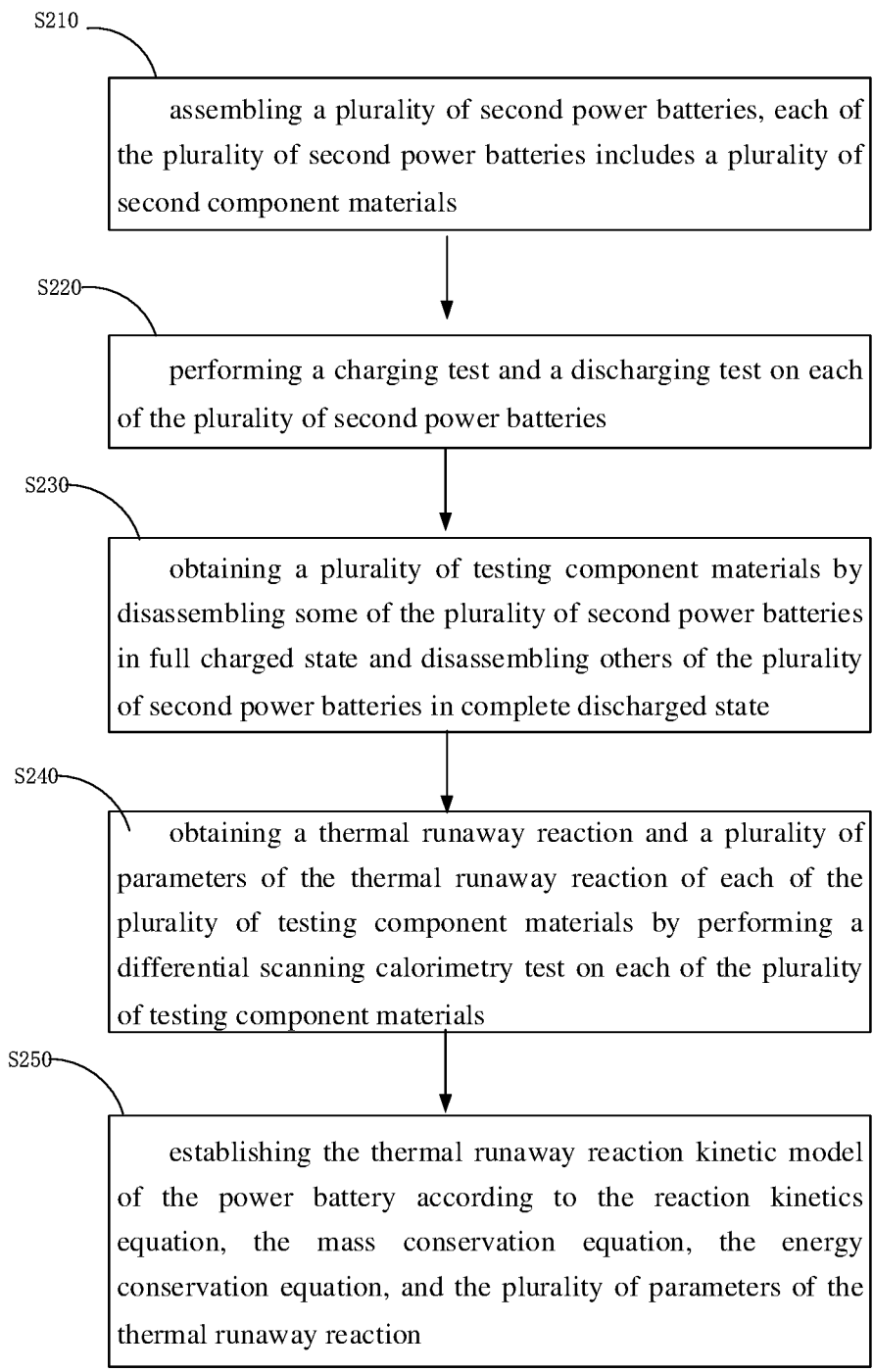
FIG. 6 is a flow chart of one embodiment of a method for establishing the thermal runaway reaction kinetic model of the power battery.

In one embodiment, as shown in FIG. 6, the thermal runaway reaction kinetic model of the power battery of step S20 can be established by the following steps:

step S210, assembling a plurality of second power batteries, each of the plurality of second power batteries includes a plurality of second component materials, and the plurality of second component materials can be a cathode electrode plate, an anode electrode plate, a separator, and an electrolyte;

step S220, performing a charging test and a discharging test on each of the plurality of second power batteries;

step S230, obtaining a plurality of testing component materials by disassembling some of the plurality of second power batteries in a fully charged state and disassembling others of the plurality of second power batteries in a completely discharged state, and the plurality of testing component materials can be a fully charged cathode electrode plate, a completely discharged cathode electrode plate, a fully charged anode electrode plate, a completely discharged anode electrode plate, the separator, and the electrolyte;

step S240, obtaining a thermal runaway reaction and a plurality of parameters of the thermal runaway reaction of each of the plurality of testing component materials by performing a differential scanning calorimetry test on each of the plurality of testing component materials; and step S250, establishing the thermal runaway reaction kinetic model of the power battery according to the reaction kinetics equation, the mass conservation equation, the energy conservation equation, and the plurality of parameters of the thermal runaway reaction.

In step S210, the second power battery can be the same as the first power battery and can be a half cell or a coin cell. The second power battery is scanning calorimetry tested and used for establishing the thermal runaway reaction kinetic model of the power battery. The first power battery is calculated according to the thermal runaway reaction kinetic model of the power battery so that the thermal runaway safety of the full battery produced according to the first power battery can be forecasted without preparing the full battery.

The materials of the second power battery can be selected according to the development requirement of the second power battery. The cathode material, the anode material, the electrolyte material, the separator material, and the binder material of the second power battery can be selected before assembling the plurality of second power batteries. The second power battery is a power battery used in the experiment. The second power battery can be a half cell or a coin cell. Different second power batteries can be made by selecting different materials. The parameters of the thermal runaway reaction can be obtained by testing the plurality of second power batteries made of different materials. The parameters of the thermal runaway reaction can be used for establishing the thermal runaway reaction kinetic model of the power battery.

For example, the cathode material of the second power battery is selected first and the cathode electrode plate is made according to the ratio requirement of each of the plurality of second power batteries. The cathode material of the second power battery is used as the cathode electrode, the lithium sheet is used as the anode electrode. One coin cell is made by the cathode electrode, the anode electrode, and some electrolyte and used as the second power battery. For another example, the anode material of the second power battery is used as the cathode electrode, the lithium sheet is used as the anode electrode. Another coin cell is made by the cathode electrode, the anode electrode, and some electrolyte and used as the second power battery.

In step S220, a plurality of fully charged second power batteries can be obtained by performing a charging test on the plurality of second power batteries, and a plurality of completely discharged second power batteries can be obtained by performing a discharging test on the plurality of second power batteries. Charging and discharging of each of the plurality of second power batteries can be tested many times.

In step S230, the fully charged cathode electrode plate and the fully charged anode electrode plate can be obtained by disassembling one of the plurality of fully charged second power batteries; and the completely discharged cathode electrode plate and the completely discharged anode electrode plate can be obtained by disassembling one of the plurality of completely discharged second power batteries.

In step S240, the thermal runaway reaction of each of the plurality of testing component materials can be obtained by the differential scanning calorimetry test results. The important parameters of the thermal runaway reaction of each of the plurality of testing component materials can also be obtained by the differential scanning calorimetry test results.

For example, the solid electrolyte interface (SEI) film decomposition reaction and anode electrode complete decomposition reaction can take place in the anode electrode plate. For another example, the cathode electrode first decomposition reaction can take place in the cathode electrode plate. For another example, the separator melting reaction can take place in the separator. All the thermal runaway reactions of the plurality of testing component materials can be obtained by the differential scanning calorimetry test results. All the thermal runaway reactions of the plurality of testing component materials can also be obtained by other method.

In step S250, in one embodiment, the thermal runaway reaction kinetic model of the power battery satisfies formula (1):

$$T = \int_t \frac{dT}{dt} dt + T_0 \qquad (1)$$

wherein, T represents the temperature of the second power battery, $T_0$ represents the self heat generation onset temperature of the second power battery, $T_0$ is equal to the minimum of the onset temperatures $T_{onset,x}$ of all the thermal runaway reactions, namely $T_0 = \min\{T_{onset,x}\}$, and $$\frac{dT}{dt}$$

represents the temperature rise rate of the second power battery.

In one embodiment, the temperature rise rate $$\frac{dT}{dt}$$

of the second power battery satisfies formula (2):

$$\frac{dT}{dt} = \frac{Q}{M \cdot C_p} \qquad (2)$$

wherein, $Q$ represents the total instantaneous heat release power of all the thermal runaway reactions of the second power battery, M represents the mass of the second power battery, and $C_p$ represents the specific heat capacity of the second power battery.

The total instantaneous heat release power $Q$ of all the thermal runaway reactions of the second power battery satisfies formula (3):

$$Q = \sum_x Q_x + Q_{mix} \qquad (3)$$

wherein, $Q_x$ represents the instantaneous heat release power of one thermal runaway reaction of the second power battery, x represents the number of all thermal runaway reactions, and $Q_{mix}$ represents the heat release power of the cathode electrode and anode electrode mixed contact reaction of the full battery planned to be prepared or made.

Figure 3:
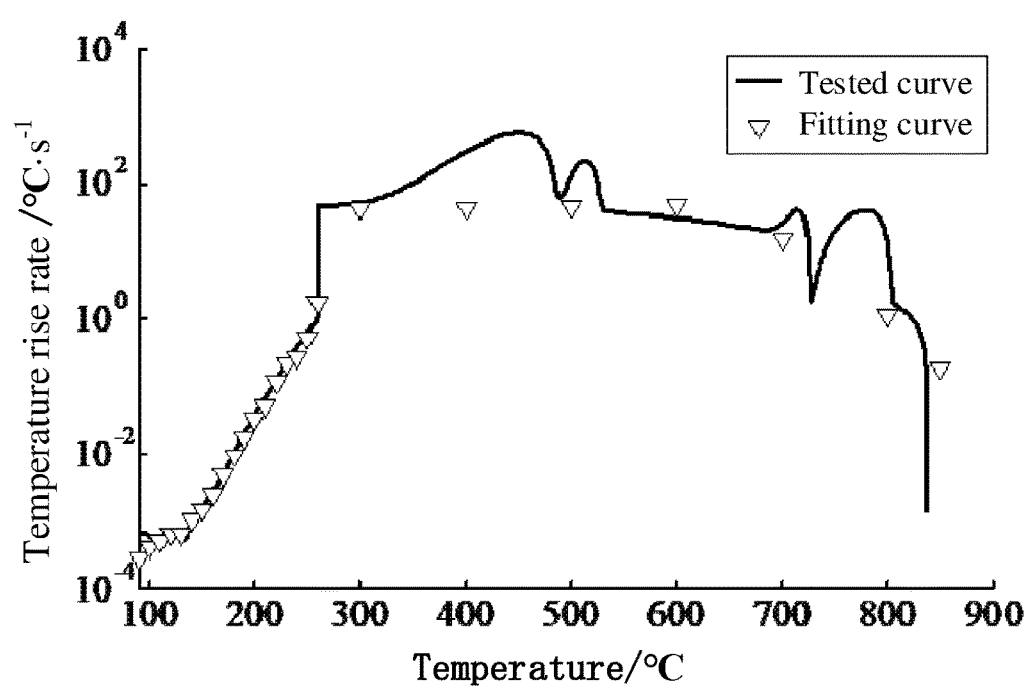
FIG. 3 shows a scanning calorimetry test result of a separator melting process under different temperature rise scanning rates and a forecasted result based on fitting the thermal runaway reaction kinetic model using the reaction kinetic parameters.

The relationship between the temperature rise rate of the second power battery and the temperature of the second power battery is fitted according to the thermal runaway reaction kinetic model of the power battery to obtain a fitting curve. In one embodiment, the relationship between the temperature rise rate of the second power battery and the temperature of the second power battery is also tested to obtain a tested curve. FIG. 3 shows both the fitting curve and the tested curve. From FIG. 3, it can be seen that the fitting curve and the tested curve are substantially coincident with each other. Thus, the thermal runaway reaction kinetic model of the power battery has good precision. The method for forecasting thermal runaway safety of a full battery can forecast the thermal runaway properties of the full battery based on the thermal runaway reaction kinetic property of the material used for making the power battery.

The method for forecasting thermal runaway safety of a full battery is based on the thermal runaway reaction kinetic model of the power battery. The thermal runaway reaction kinetic model of the power battery is based on the superposition principle of the thermal runaway reactions. In the thermal runaway reaction kinetic test of the plurality of testing component materials of the second power battery, the scanning calorimetry test is performed at a constant rate, and a plurality of heat release characteristic curves are obtained and used for fitting the reaction kinetic parameters. The in situ effect of the thermal runaway reaction is considered in all the data and parameters of the thermal runaway reaction kinetic test. All the important exothermic reactions of the full battery to be prepared or made are considered in establishing the thermal runaway reaction kinetic model of the power battery. The heat release of the cathode electrode and anode electrode mixed contact reaction is considered in establishing the thermal runaway reaction kinetic model of the power battery. The heat release of the cathode electrode and anode electrode mixed contact reaction includes both the internal short circuit heat release and the redox reaction heat release of the cathode electrode and anode electrode.

In one embodiment of the step S210, the cathode material of the cathode electrode plate and the anode material of the anode electrode plate of the second power battery are selected according to the formula (4)

$$SE_{cell} = \frac{SC_{ca}}{m_{an}/m_{ca} + 1} \times V_{rate} \times \zeta_{act} \times \eta_{act} \qquad (4)$$

wherein $SE_{cell}$ represents the specific energy of the second power battery, $SC_{ca}$ represents the specific capacity of the cathode material of the cathode electrode plate, $m_{an}/m_{ca}$ represents the mass ratio of the anode material and the cathode material, $V_{rate}$ represents the design nominal voltage of the second power battery, $\zeta_{act}$ represents the mass percentage between the active material of the cathode material and the second power battery, and $\eta_{act}$ represents the average utilization of the active material of the cathode material.

In one embodiment, the total capacity of the anode electrode plate is defined as $C_{an}$, and $C_{an} = SC_{an} \cdot m_{an}$. The total capacity of the cathode electrode plate is defined as $C_{ca}$, and $C_{ca}=SC_{ca} \cdot m_{ca}$. The ratio κ between the total capacity $C_{an}$ of the anode electrode plate and the total capacity $C_{ca}$ of the cathode electrode plate should be greater than 1. The ratio κ can be in a range from about 1.05 to about 1.2. $SC_{an}$ represents the specific capacity of the anode material of the anode electrode plate, $SC_{ca}$ represents the specific capacity of the cathode material of the cathode electrode plate, $m_{an}$ represents the mass of the anode material, and $m_{ca}$ represents the mass of the cathode material.

Both the cathode electrode plate and the anode electrode plate are used as the cathode electrode of the half cell, and the lithium sheet is used as the anode electrode of the half cell. One coin cell is made by the cathode electrode, the anode electrode, and some electrolyte. The electrolyte used in the half cell is the same as the electrolyte used in the full battery. The battery formation is performed after assembling the coin cell, so that the interface protection membrane is formed on the surface of both the cathode electrode plate and the anode electrode plate. The charge/discharge cycle is performed on the coin cell so that both the cathode electrode plate and the anode electrode plate are respectively in fully charged state and in completely discharged state. The coin cell is disassembled after the charge/discharge cycle. Thus, the fully charged cathode electrode plate, the completely discharged cathode electrode plate, the fully charged anode electrode plate, and the completely discharged anode electrode plate are obtained. The coin cell is disassembled in a glovebox filled with argon gas. The glovebox (or glove box) is a sealed container that is designed to allow one to manipulate objects where a separate atmosphere is desired. Built into the sides of the glovebox are gloves arranged in such a way that the user can place their hands into the gloves and perform tasks inside the box without breaking containment. All the fully charged cathode electrode plate, the completely discharged cathode electrode plate, the fully charged anode electrode plate, and the completely discharged anode electrode plate are sealed in the crucible in the glove box and used as the sample of the differential scanning calorimeter. Furthermore, the electrolyte and separator are obtained by disassembling the coin cell is in the glove box and directly sealed in the crucible in the glove box. Thus, the in situ effect is kept.

In one embodiment, the step S240 includes the following steps:

step S241, obtaining N groups of differential scanning calorimetry test results by performing differential scanning calorimetry tests N times at different constant temperature rise scanning rates on each of the plurality of testing component materials of the second power battery, wherein N is a positive integer greater than or equal to 5;

step S242, obtaining a thermal runaway reaction and a plurality of parameters of the thermal runaway reaction of each of the plurality of testing component materials by the N groups of differential scanning calorimetry test results.

In one embodiment of step S241, the differential scanning calorimetry test includes the following steps:

step S2411, selecting one of the plurality of testing component materials of the second power battery and connecting the one of the plurality of testing component materials to the differential scanning calorimeter;

step S2412, testing once by setting the constant temperature rise scanning rate $β_i$ and recording one group of differential scanning calorimetry test results; and step S2413, repeating the step S2412 N times, wherein N is a positive integer greater than or equal to 5, and the constant temperature rise scanning rates are different in the N times tests.

In one embodiment of step S2412 and step S2413, the constant temperature rise scanning rates $β_i$ can be 0.1° C./min, 0.2° C./min, 0.5° C./min, 1° C./min, 2° C./min, 5° C./min, 10° C./min, 15° C./min, 20° C./min. In one embodiment, five groups of differential scanning calorimetry test results are obtained and includes a first group test results, a second group test results, a third group test results, a fourth group test results, and a fifth group test results. Each group test results include a plurality of test results. For example, the first group test results include a first group first time test result, a first group second time test result, a first group third time test result, and so on.

In one embodiment of step S242, the thermal runaway reaction can be a solid electrolyte interface film decomposition reaction, a reaction between the anode electrode and the electrolyte of the second power battery, an anode solid electrolyte interface film regenerating reaction of the second power battery, an anode electrode complete decomposition reaction of the second power battery, an cathode electrode first decomposition reaction of the second power battery, an cathode electrode second decomposition reaction of the second power battery, a separator melting reaction of the second power battery, an electrolyte decomposition reaction of the second power battery, and the cathode electrode and the anode electrode mixed contact reaction of the second power battery. The differential scanning calorimetry test results can include an instantaneous heat release power $Q_y$, a temperature curve $T_y$, and a testing time $t_y$.

The differential scanning calorimetry tests are performed on each of the fully charged cathode electrode plate, the completely discharged cathode electrode plate, the fully charged anode electrode plate, and the completely discharged anode electrode plate. The differential scanning calorimetry tests are also performed on each of the separator, the electrolyte, the binder, and other components, that are planned to be used in the second power battery. For example, the fully charged cathode electrode plate is located on the differential scanning calorimeter, and the differential scanning calorimetry test is performed on the fully charged cathode electrode plate at the constant temperature rise scanning rate $β_i$. The important exothermic reactions x of the testing component materials at high temperature are obtained by analyzing the N groups of differential scanning calorimetry test results. The unimportant exothermic reactions are not considered in the following step of establishing the thermal runaway reaction kinetic model of the power battery. The testing component materials, which are differential scanning calorimetry tested, are defined as sample y. Each sample y may have many important exothermic reactions x. Thus, subscripts of the important exothermic reactions x of the testing component materials y can be x=y_1, x=y_2, x=y_3 and so on. For example, the subscript of the fully charged cathode electrode plate is x=y_1_100%, and subscript of the completely discharged cathode electrode plate is x=y_1_0%.

In one embodiment, the important exothermic reactions x of the testing component materials at high temperature are obtained and shown in Table 1 below.

TABLE 1 Shows the Important Exothermic
Reactions x of the Testing Component Materials y

| Name of the testing component materials y | Symbol of testing component materials y | Type of the reaction x | Symbol of reaction x | Whether related to SOC | Symbol of reaction x when SOC = 0% | Symbol of reaction x when SOC = 100% |
|---|---|---|---|---|---|---|
| Anode | an | SEI film decomposition | an_1 | No | — | — |
| | | Reaction between the anode electrode and the electrolyte, and SEI film regenerating | an_2 | Yes | an_2_0% | an_2_100% |
| | | Anode electrode complete decomposition | an_3 | Yes | an_3_0% | an_3_100% |
| Cathode | ca | Cathode first decomposition | ca_1 | Yes | ca_1_0% | ca_1_100% |
| | | Cathode electrode second decomposition | ca_2 | Yes | ca_2_0% | ca_2_100% |
| Separator | sep | Separator melting | sep | No | — | — |
| Electrolyte | ele | Electrolyte decomposition | ele | No | — | — |

In one embodiment, the key parameters in the Arrhenius equation of each exothermic reaction x are fitted according to the differential scanning calorimetry test results at a constant temperature rise scanning rate. The reaction rate of each testing component material of the second power battery can satisfy the formula (5):

$$\frac{dc_x}{dt} = A_x \cdot f(c_x) \cdot \exp\left(-\frac{E_{a,x}}{R \cdot T}\right), (T > T_{onset,x}) \quad (5)$$

wherein, $c_x$ represents the normalized concentration of the reaction materials of the testing component material of the second power battery, and the unit is 1; $A_x$ represents the frequency factor, and the unit is $s^{-1}$; $E_{a,x}$ represents the activation energy of the reaction kinetics, and the unit is J; R represents the ideal gas constant and is equal to 8.314 $J \cdot mol^{-1} \cdot K^{-1}$; $T_{onset,x}$ represents the onset temperature of the thermal runaway reaction x. The frequency factor $A_x$, the activation energy $E_{a,x}$ of the reaction kinetics, and the onset temperature $T_{onset,x}$ of the thermal runaway reaction x are the key parameters in the Arrhenius equation. $f(c_x)$ represents the mode of the thermal runaway reaction x and satisfies the formula (6):

$$f(c_x) = c_x^{p_x} \cdot (1-c_x)^{q_x} \cdot \{\ln(1-c_x)\}^{s_x} \quad (6)$$

wherein, $p_x$, $q_x$, $s_x$ represents the order of the thermal runaway reaction x. In one embodiment, the thermal runaway reaction x can be set to have orders from 0 to 4.

Figure 4:
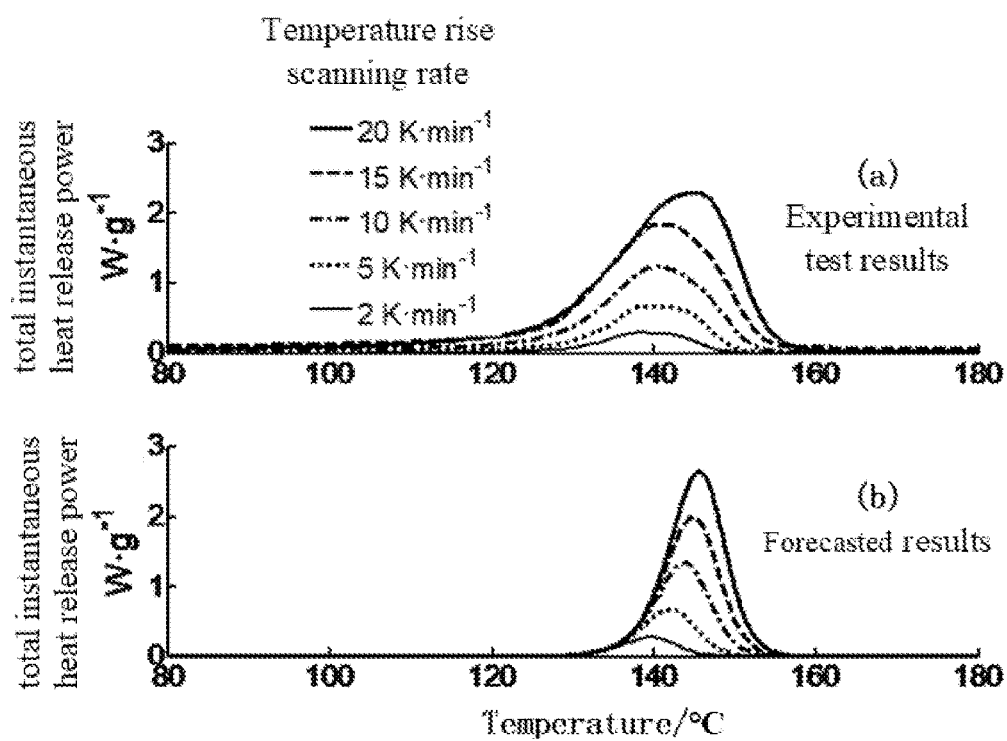
FIG. 4 shows a comparison between a forecasted result of a full battery based on the thermal runaway reaction kinetic model of the power battery and an experimental test result of the full battery of one embodiment.

Referring to FIG. 4, in one embodiment of step S30, a comparison between a forecasted result of a full battery based on the thermal runaway reaction kinetic model of the power battery and an experimental test result of the full battery of one embodiment. The thermal runaway reaction x is the separator melting reaction, namely, x=sep. The differential scanning calorimetry tests are performed five times on the separator material at five different constant temperature rise scanning rates. The five different constant temperature rise scanning rates are 2° C./min, 5° C./min, 10° C./min, 15° C./min, and 20° C./min. The five differential scanning calorimetry test results are shown in the above diagram (a) of FIG. 4. The key parameters in the Arrhenius equation of the separator melting reaction x=sep are fitted according to the formulas (5) and (6) by an optimization method. The optimal parameters are $A_{sep}=5 \times 10^{67}$, $E_{a,sep}=5.5 \times 10^5$, $T_{onset,x}=110°$ C., $p_x=1.5$, $q_x=0$, and $s_x=0$.

The below diagram (b) of FIG. 4 shows forecast results calculated based on the Arrhenius equation of the chemical reaction kinetics by substituting the optimal parameters in the formulas (5) and (6). The calculated results of below diagram (b) are in good agreement with the test results of above diagram (a). Thus, the reaction kinetic parameters fitted by above method are reasonable. The reaction kinetic parameters of all the thermal runaway reactions x above are obtained by the Arrhenius equation of the chemical reaction kinetics and shown in table 2 below.

TABLE 2 Shows the Reaction Kinetic Parameters
Based on the Arrhenius Equation of the Chemical
Reaction Kinetics

| Symbol of reaction x | Reaction kinetic parameters | | | Reaction grade number | | |
|---|---|---|---|---|---|---|
| | $A_x [s^{-1}]$ | $E_{a,x} [J]$ | $T_{onset,x} [°C.]$ | $p_x$ | $q_x$ | $s_x$ |
| an_1 | $1.67 \times 10^{15}$ | $1.35 \times 10^5$ | 50 | 1 | 0 | 0 |
| an_2_0% | 0.05 | $3.5 \times 10^4$ | 50 | 1 | 0 | 0 |
| an_2_100% | 0.10 | $3.0 \times 10^4$ | 50 | 1 | 0 | 0 |
| an_3_0% | 5.0 | $4.4 \times 10^4$ | 280 | 1 | 0 | 0 |
| an_3_100% | 5.0 | $3.3 \times 10^4$ | 280 | 1 | 0 | 0 |
| ca_1_0% | $2.0 \times 10^6$ | $8.0 \times 10^4$ | 170 | 1 | 1 | 0 |
| ca_1_100% | $1.2 \times 10^9$ | $1.15 \times 10^5$ | 170 | 1 | 1 | 0 |
| ca_2_0% | $7.0 \times 10^9$ | $1.9 \times 10^5$ | 220 | 1 | 1 | 0 |
| ca_2_100% | $6.0 \times 10^{11}$ | $2.1 \times 10^5$ | 220 | 1 | 1 | 0 |
| sep | $5 \times 10^{67}$ | $5.5 \times 10^5$ | 110 | 1.5 | 0 | 0 |
| ele | $4.2 \times 10^{10}$ | $1.3 \times 10^5$ | 120 | 1 | 0 | 0 |

In one embodiment, the heat release power $Q_{mix}$ of the cathode electrode and anode electrode mixed contact reaction of the second power battery satisfies the formula (7):

$$Q_{mix} = \eta_{mix} \cdot \Delta H_{mix} \cdot \frac{dSOC}{dt} \qquad (7)$$

wherein, $\eta_{mix}$ represents the energy release efficiency of the cathode electrode and anode electrode mixed contact reaction of the second power battery; $\Delta H_{mix}$ represents the total energy release of the cathode electrode and anode electrode mixed contact reaction of the second power battery; SOC represents the state of charge of the second power battery; and $$\frac{dSOC}{dt}$$

represents the change rate of the state of charge of the second power battery.

$$\frac{dSOC}{dt}$$

satisfies the formula (8):

$$\frac{dSOC}{dt} = \frac{1}{\Delta t} \cdot SOC, (T > T_{mix}) \qquad (8)$$

where, $\Delta t$ represents the speed control of the energy release of the cathode electrode and anode electrode mixed contact reaction of the second power battery, the unit is second (s). In one embodiment, $\Delta t=10$ s.

In one embodiment, the onset temperature $T_{mix}$ caused by the cathode electrode and anode electrode mixed contact reaction and the onset temperature $T_{mix}$ caused by the separator collapse is obtained according to the differential scanning calorimetry test results at constant temperature rise of the separator. The heat release power $Q_{mix}$ and heat release equation of the cathode electrode and anode electrode mixed contact reaction is obtained according to the heat release test results of mixing cathode material and anode material performed by the differential scanning calorimeter. The heat release caused by mixing cathode material and anode material includes the first heat release and the second heat release. The first heat release is caused by the short circuit between the cathode material and the anode material after the separator collapses. The second heat release is caused by the redox reaction of the cathode electrode and anode electrode mixed contact. It is difficult to distinguish the first heat release from the second heat release. However, both the first heat release and the second heat release are related to the state of charge of the second power battery.

In one embodiment, the capacity of the second power battery is 25 Ah, and the total energy release $\Delta H_{mix}$ is $3.7 \times 10^6$ J, obtained according to the cathode electrode and anode electrode mixed contact reaction test performed by the differential scanning calorimeter. The onset temperature $T_{mix}$ caused by the cathode electrode and anode electrode mixed contact reaction is equal to the collapse temperature of the separator. In one embodiment, the collapse temperature of the separator is $T_{mix}=260°$ C.

In one embodiment, the instantaneous heat release power $Q_x$ of the thermal runaway reaction of the second power battery satisfies the formula (9):

$$Q_x = \Delta H_x \cdot m_x \cdot \frac{dc_x}{dt} \qquad (9)$$

wherein, $\Delta H_x$ represents the total energy release of unit mass of the testing component material of the second power battery corresponding to the thermal runaway reaction x, the unit is $J \cdot g^{-1}$; $m_x$ represents the mass of the testing component material of the second power battery, and the unit is gram (g); and $$\frac{dc_x}{dt}$$

represents the reaction rate of the testing component material of the second power battery.

$$\frac{dc_x}{dt}$$

satisfies the Arrhenius equation of the formula (5).

In one embodiment, the testing component material of the second power battery is the cathode electrode plate or the anode electrode plate. The instantaneous heat release power $Q_x$ of the exothermic reaction x of the cathode electrode plate or the anode electrode plate is weighted mean of the instantaneous heat release power $Q_{x\_100\%}$ in the fully charged state and the instantaneous heat release power $Q_{x\_0\%}$ in the completely discharged state. The instantaneous heat release power $Q_x$ satisfies the formula (10):

$$Q_x = \eta_x \cdot \Delta H_{x\_100\%} \cdot m_x \cdot \frac{dc_{x\_100\%}}{dt} + (1-\eta_x) \cdot \Delta H_{x\_0\%} \cdot m_x \cdot \frac{dc_{x\_0\%}}{dt} \qquad (10)$$

wherein, $\eta_x$ represents the heat release efficiency of the cathode electrode plate or the heat release efficiency of the anode electrode plate; $\Delta H_x$ represents the total energy release of unit mass of the testing component material of the second power battery corresponding to the thermal runaway reaction x, the unit is $J \cdot g^{-1}$; $m_x$ represents the mass of the testing component material of the second power battery, and the unit is g; and $$\frac{dc_x}{dt}$$

represents the reaction rate of the testing component material of the second power battery.

In one embodiment, $\eta_x$ represents the heat release efficiency of the cathode electrode plate under the coupling condition between the thermal decomposition of cathode material and the mixed contact reaction of cathode electrode and anode electrode, or represents the heat release efficiency of the anode electrode plate under the coupling condition between the thermal decomposition of anode material and the mixed contact reaction of cathode electrode and anode electrode. $\eta_{mix}$ represents the energy release efficiency of the cathode electrode plate and the heat release efficiency of the anode electrode plate under the condition of the cathode electrode and anode electrode mixed contact. The heat release efficiency $\eta_x$ is related to the state of charge of the second power battery. The greater the state of charge, the greater the heat release efficiency $\eta_x$ is. When the state of charge is SOC=100%, $\eta_x$=1. The energy release efficiency $\eta_{mix}$ is related to the reaction degree of the cathode electrode plate or the anode electrode plate. When neither the cathode material of the cathode electrode plate nor the anode material of the anode electrode plate has a reaction, $\eta_{mix}$=1. When one of the cathode material of the cathode electrode plate and the anode material of the anode electrode plate has complete decomposition reaction, $\eta_{mix}$=0.

In one embodiment, the relationship between the heat release efficiency $\eta_x$ and the state of charge SOC of the second power battery satisfies the formula (11):

$$\eta_x = SOC/100\% \quad (11).$$

In one embodiment, the relationship between the energy release efficiency $\eta_{mix}$ and the normalized concentration $c_x$ of the cathode reaction materials or the anode reaction materials of the satisfies the formula (12):

$$\eta_{mix} = \min\{c_{an\_3\_100\%}, c_{ca\_2\_100\%}\} \quad (12).$$

The total energy release $\Delta H_x$ of the main exothermic reactions x and the mass $m_x$ of the testing component materials of the second power battery.

TABLE 3 Shows the $\Delta H_x$ of the Main Exothermic Reactions x and the $m_x$

| Symbol of the reaction x | $\Delta H_x$ [J · g$^{-1}$] | $m_x$ [g] |
|---|---|---|
| an__1 | 257 | 100.58 |
| an__2__0% | 500 | |
| an__2__100% | 800 | |
| an__3__0% | 600 | |
| an__3__100% | 1000 | |
| ca__1__0% | 100 | 179.12 |
| ca__1__100% | 300 | |
| ca__2__0% | 150 | |
| ca__2__100% | 360 | |
| sep | −233 | 17.6 |
| ele | 1800 | 108 |

The instantaneous heat release power $Q_x$ of the exothermic reaction x of the cathode electrode plate or the anode electrode plate can be calculated by the formula (10) using the heat release efficiency $\eta_x$ of the formula (11). The heat release power $Q_{mix}$ of the cathode electrode and anode electrode mixed contact reaction of the second power battery can be calculated by the change rate of the state of charge of formula (8) and the energy release efficiency $\eta_{mix}$ of the formula (12). The thermal runaway reaction kinetic model satisfies formula (1) and is established according to the superposition principle of the thermal runaway reaction and energy conservation equation.

The thermal runaway reaction kinetic model is shown as the formula (1) and obtained by the derivation of a large number of experimental and theoretical data. Many experiments and theoretical data proofs that the thermal runaway reaction kinetic model can be used to forecast the thermal runaway safety of the full battery without preparing a full battery. The method for forecasting the thermal runaway safety of the power battery can simplify the conventional safety design process of the power battery by omitting the step of assembling the full battery. Thus, the research and development cycle of the power batter is shortened, the design and development cost is reduced, and the design and development efficiency is improved.

Figure 5:
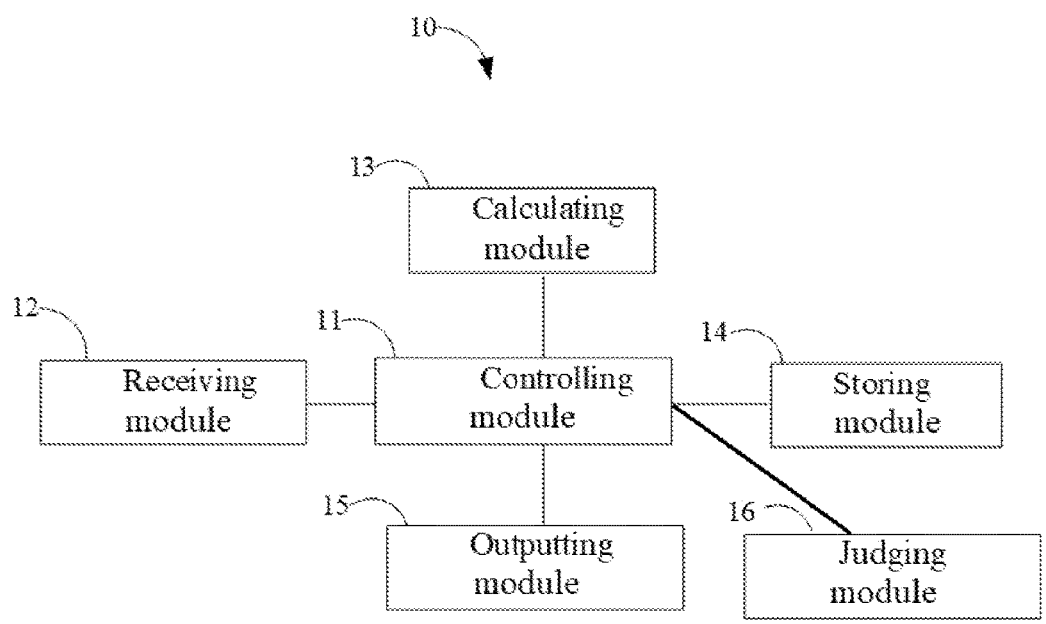
FIG. 5 is a block diagram of one embodiment of a work process of a device for forecasting thermal runaway safety of a full battery.

Referring to FIG. 5, one embodiment of a computer device 10 for forecasting thermal runaway safety of a full battery is disclosed. The computer device 10 includes a controlling module 11, a receiving module 12, a calculating module 13, a storing module 14, an outputting module 15, and a judging module 16. The computer device 10 is connected to perform the method of FIG. 1.

The controlling module 11 is wired or wirelessly connected to the receiving module 12, the calculating module 13, the storing module 14, the outputting module 15, and the judging module 16. The receiving module 12 is configured to receive the self heat generation onset temperature $T_0$ of the first power battery. The receiving module 12 can be a communication module. The receiving module 12 can be an inputting module such as a keyboard. The calculating module 13 is configured to calculate the maximum temperature $T_{max}$ of thermal runaway of the first power battery based on a thermal runaway reaction kinetic model stored in the compute or calculate the maximum temperature rise $\Delta T$. The storing module 14 is configured to store the thermal runaway reaction kinetic model or other data such as tables 1-3 and formulas (1)-(12). The judging module 16 is configured to obtain a forecasted result by comparing the maximum temperature $T_{max}$ with a threshold temperature, or selecting the minimum from a plurality of maximum temperature rise $\Delta T$ of a plurality of first power batteries. The outputting module 15 is configured to show the forecasted result to the user. The outputting module 15 can be a display.

Figure 7:
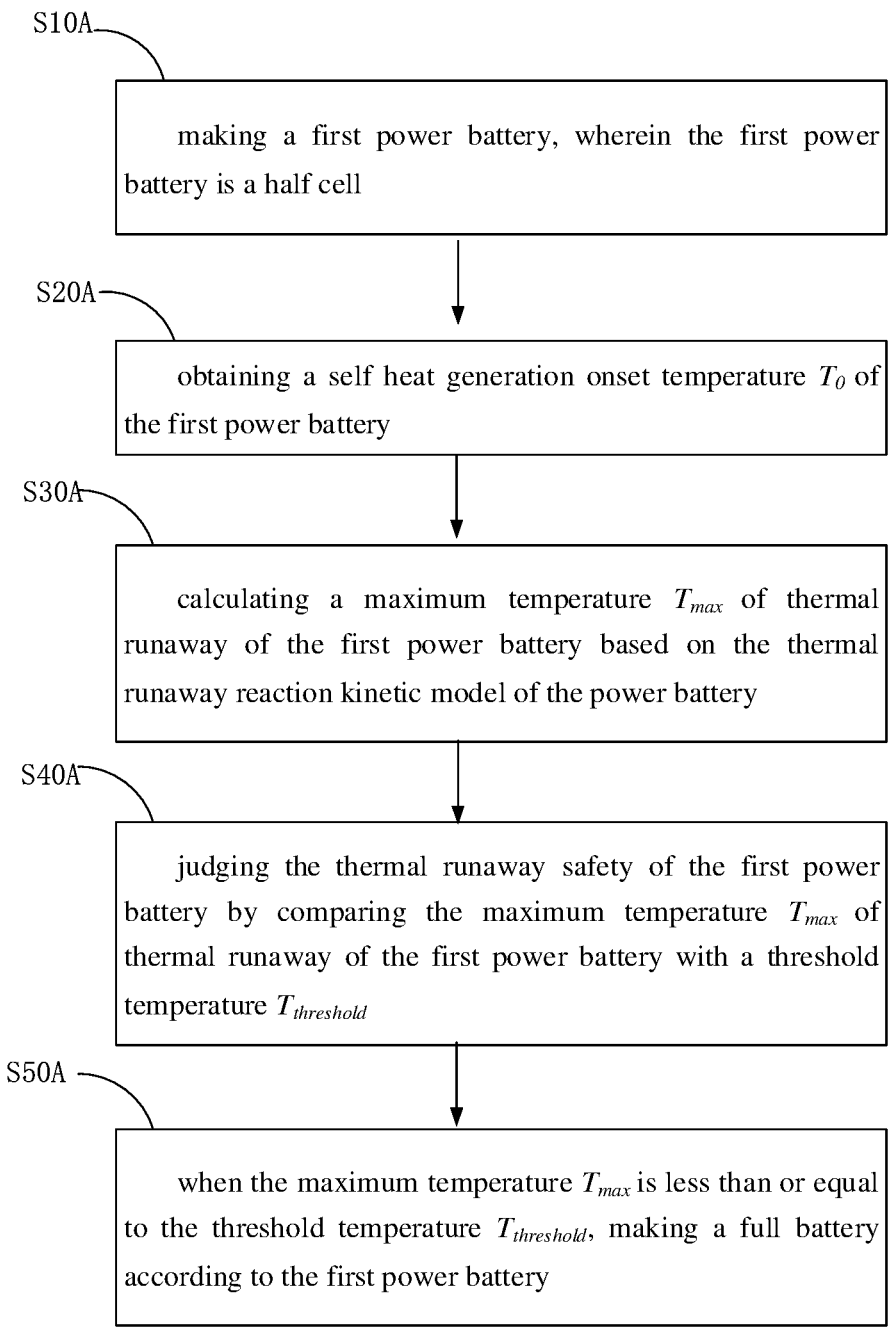
FIG. 7 is a flow chart of one embodiment of a method for making a full battery.

Referring to FIG. 7, one embodiment of a method for making a full battery is disclosed. The method includes:

step S10A, making a first power battery, wherein the first power battery is a half cell;

step S20A, obtaining a self heat generation onset temperature $T_0$ of the first power battery;

step S30A, calculating a maximum temperature $T_{max}$ of thermal runaway of the first power battery based on the thermal runaway reaction kinetic model of the power battery;

step S40A, judging the thermal runaway safety of the first power battery by comparing the maximum temperature $T_{max}$ of thermal runaway of the first power battery with a threshold temperature $T_{threshold}$; and step S50A, when the maximum temperature $T_{max}$ is less than or equal to the threshold temperature $T_{threshold}$, making a full battery according to the first power battery.

Step S50A can further include: when the maximum temperature $T_{max}$ is greater than the threshold temperature $T_{threshold}$, changing the materials of the first power battery so that the maximum temperature $T_{max}$ is less than or equal to the threshold temperature $T_{threshold}$.

Figure 8:
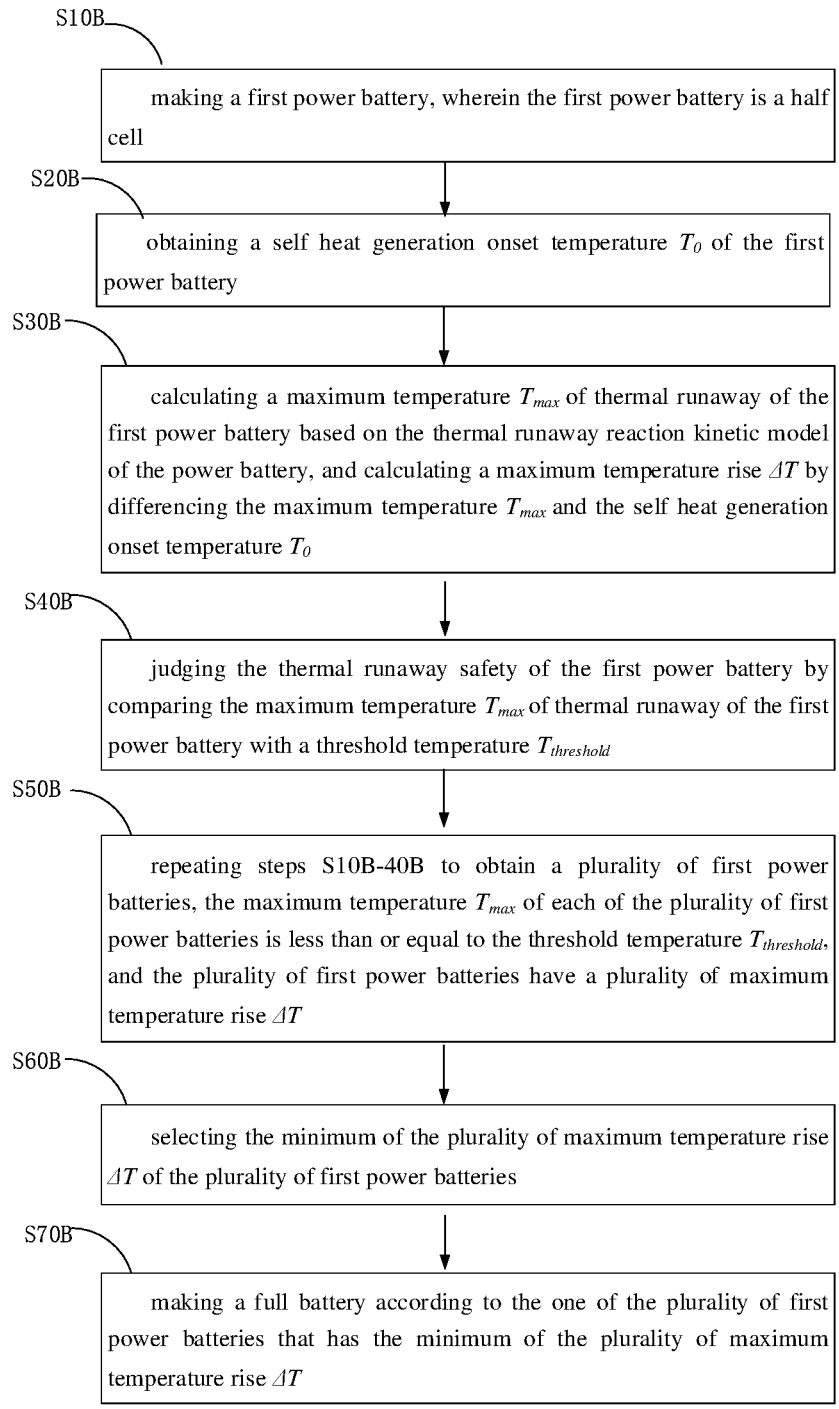
FIG. 8 is a flow chart of one embodiment of a method for making a full battery.

Referring to FIG. 8, one embodiment of a method for making a full battery is disclosed. The method includes:

step S10B, making a first power battery, wherein the first power battery is a half cell;

step S20B, obtaining a self heat generation onset temperature $T_0$ of the first power battery;

step S30B, calculating a maximum temperature $T_{max}$ of thermal runaway of the first power battery based on the thermal runaway reaction kinetic model of the power battery, and calculating a maximum temperature rise $\Delta T$ by taking the difference between the maximum temperature $T_{max}$ and the self heat generation onset temperature $T_0$;

step S40B, judging the thermal runaway safety of the first power battery by comparing the maximum temperature $T_{max}$ of thermal runaway of the first power battery with a threshold temperature $T_{threshold}$;

step S50B, repeating steps S10B-40B to obtain a plurality of first power batteries, the maximum temperature $T_{max}$ of each of the plurality of first power batteries is less than or equal to the threshold temperature $T_{threshold}$, and the plurality of first power batteries have a plurality of maximum temperature rise $\Delta T$;

step S60B, selecting the minimum of the plurality of maximum temperature rise $\Delta T$ of the plurality of first power batteries; and step S70B, making a full battery according to the one of the plurality of first power batteries that has the minimum of the plurality of maximum temperature rise $\Delta T$.

Step S40B can further include: when the maximum temperature $T_{max}$ is greater than the threshold temperature $T_{threshold}$, changing the materials of the first power battery so that the maximum temperature $T_{max}$ is less than or equal to the threshold temperature $T_{threshold}$.

Figure 9:
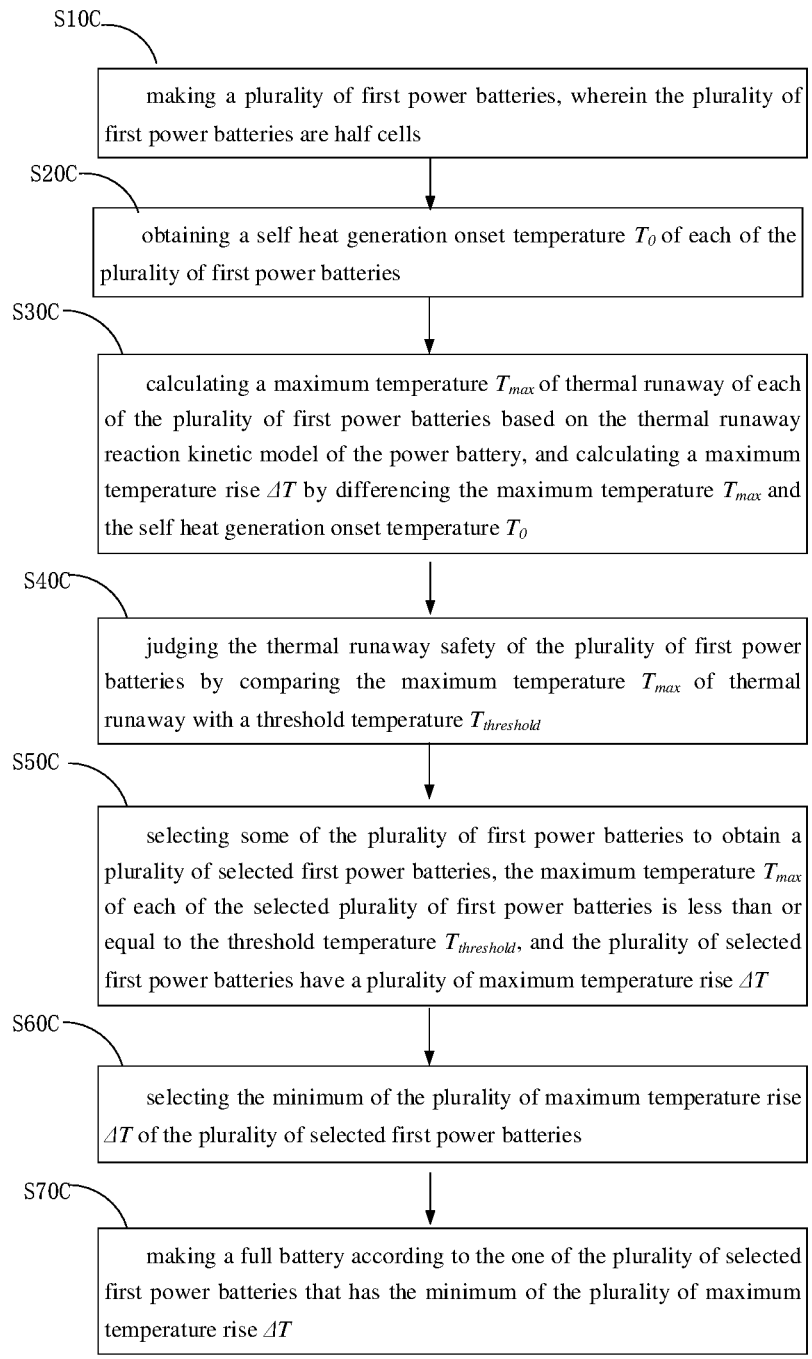
FIG. 9 is a flow chart of one embodiment of a method for making a full battery.

Referring to FIG. 9, one embodiment of a method for making a full battery is disclosed. The method includes:

step S10C, making a plurality of first power batteries, wherein the plurality of first power batteries are half cells;

step S20C, obtaining a self heat generation onset temperature $T_0$ of each of the plurality of first power batteries;

step S30C, calculating a maximum temperature $T_{max}$ of thermal runaway of each of the plurality of first power batteries based on the thermal runaway reaction kinetic model of the power battery, and calculating a maximum temperature rise $\Delta T$ by making difference between the maximum temperature $T_{max}$ and the self heat generation onset temperature $T_0$;

step S40C, judging the thermal runaway safety of the plurality of first power batteries by comparing the maximum temperature $T_{max}$ of thermal runaway with a threshold temperature $T_{threshold}$;

step S50C, selecting some of the plurality of first power batteries to obtain a plurality of selected first power batteries, the maximum temperature $T_{max}$ of each of the selected plurality of first power batteries is less than or equal to the threshold temperature $T_{threshold}$, and the plurality of selected first power batteries have a plurality of maximum temperature rise $\Delta T$;

step S60C, selecting the minimum of the plurality of maximum temperature rise $\Delta T$ of the plurality of selected first power batteries; and step S70C, making a full battery according to the one of the plurality of selected first power batteries that has the minimum of the plurality of maximum temperature rise $\Delta T$.

It is to be understood that the above-described exemplary embodiments are intended to illustrate rather than limit the disclosure. Any elements described in accordance with any exemplary embodiments is understood that they can be used in addition or substituted in other exemplary embodiments. Exemplary embodiments can also be used together. Variations may be made to the exemplary embodiments without departing from the spirit of the disclosure. The above-described exemplary embodiments illustrate the scope of the disclosure but do not restrict the scope of the disclosure.

Depending on the exemplary embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a full battery, comprising:
    making a plurality of first power batteries, wherein each of the plurality of the first power batteries is a half cell;
    obtaining a self heat generation onset temperature $T_0$ of each of the first power batteries;
    establishing a thermal runaway reaction kinetic model, wherein the establishing the thermal runaway reaction kinetic model comprises:
        assembling a plurality of second power batteries, each of the plurality of second power batteries comprises a plurality of second component materials, and the plurality of second component materials comprises a cathode electrode plate, an anode electrode plate, a separator, and an electrolyte;
        performing a charging test and a discharging test on each of the plurality of second power batteries:
        obtaining a plurality of testing component materials by disassembling some of the plurality of second power batteries in a fully charged state and disassembling others of the plurality of second power batteries in a completely discharged state, wherein the plurality of testing component materials comprises a fully charged cathode electrode plate, a completely discharged cathode electrode plate, a fully charged anode electrode plate, a completely discharged anode electrode plate, the separator, and the electrolyte;
        obtaining a thermal runaway reaction and a plurality of parameters of the thermal runaway reaction of each of the plurality of testing component materials by performing a differential scanning calorimetry test on each of the plurality of testing component materials; and
        establishing the thermal runaway reaction kinetic model according to a reaction kinetics equation, a mass conservation equation, a energy conservation equation, and the plurality of parameters of the thermal runaway reaction, wherein the thermal runaway reaction kinetic model satisfies a first formula:

$$T = \int_t \frac{dT}{dt} dt + T_0$$

wherein T represents a temperature of the first power battery or the second power battery, $T_0$ represents a self heat generation onset temperature of the first power battery or the second power battery, $T_0$ is equal to a minimum of onset temperatures $T_{onset,x}$ of all the thermal runaway reactions, and $$\frac{dT}{dt}$$

represents a temperature rise rate of the first power battery or the second power battery;
    calculating a maximum temperature $T_{max}$ of thermal runaway of each of the first power batteries based on the thermal runaway reaction kinetic model by a computer;

determining the thermal runaway safety of each of the first power batteries by comparing the maximum temperature $T_{max}$ of thermal runaway of EACH OF the first power batteries with a threshold temperature $T_{threshold}$;

selecting some of the plurality of first power batteries which have the maximum temperature $T_{max}$ less than or equal to the threshold temperature $T_{threshold}$ as selected first power batteries; and assembling a full battery comprising the selected first power batteries to prevent or mitigate thermal runaway.

2. The method of claim 1, wherein the temperature rise rate $$\frac{dT}{dt}$$

satisfies a second formula:

$$\frac{dT}{dt} = \frac{Q}{M \cdot C_p}$$

wherein $Q$ represents a total instantaneous heat release power of all the thermal runaway reactions of the first power battery or the second power battery, M represents a mass of the first power battery or the second power battery, and $C_p$ represents a specific heat capacity of the first power battery or the second power battery;

wherein the total instantaneous heat release power $Q$ satisfies a third formula:

$$Q = \sum_x Q_x + Q_{mix}$$

wherein $Q_x$ represents an instantaneous heat release power of a thermal runaway reaction, x represents a number of all thermal runaway reactions, and $Q_{mix}$ represents a heat release power of a cathode electrode and an anode electrode mixed contact reaction of the first power battery or the second power battery.

3. The method of claim 2, wherein the instantaneous heat release power $Q_x$ satisfies a fourth formula:

$$Q_x = \Delta H_x \cdot m_x \cdot \frac{dc_x}{dt}$$

wherein $\Delta H_x$ represents a total energy release of unit mass of the testing component material corresponding to a thermal runaway reaction x; $m_x$ represents a mass of the testing component material; and $$\frac{dc_x}{dt}$$

represents a reaction rate of the testing component material; wherein the reaction rate satisfies a fifth formula:

$$\frac{dc_x}{dt} = A_x \cdot f(c_x) \cdot \exp\left(-\frac{E_{a,x}}{R \cdot T}\right), (T > T_{onset,x})$$

wherein $c_x$ represents a normalized concentration of reaction materials of the testing component material of the first power battery or the second power battery; $A_x$ represents a frequency factor; $E_{a,x}$ represents an activation energy of the reaction kinetics; R represents an ideal gas constant and is equal to 8.314J·mol⁻¹·K⁻¹; $T_{onset,x}$ represents an onset temperature of the thermal runaway reaction x, and $f(c_x)$ represents a mode of the thermal runaway reaction x;

wherein the mode $f(c_x)$ satisfies a sixth formula:

$$f(c_x) = c_x^{p_x} \cdot (1-c_x)^{q_x} \cdot \{\ln(1-c_x)\}^{s_x}$$

wherein $p_x$, $q_x$, and $s_x$ represents the order of the thermal runaway reaction x.

4. The method of claim 2, wherein the instantaneous heat release power $Q_x$ satisfies a fourth formula:

$$Q_x = \eta_x \cdot \Delta H_{x\_100\%} \cdot m_x \cdot \frac{dc_{x\_100\%}}{dt} + (1-\eta_x) \cdot \Delta H_{x\_0\%} \cdot m_x \cdot \frac{dc_{x\_0\%}}{dt}$$

wherein $\eta_x$ represents a heat release efficiency of a cathode electrode plate or a heat release efficiency of an anode electrode plate; $\Delta H_x$ represents a total energy release of unit mass of the testing component material corresponding to the thermal runaway reaction x; $m_x$ represents a mass of the testing component material of the first power battery or the second power battery; and $$\frac{dc_x}{dt}$$

represents a reaction rate of the testing component material of the first power battery or the second power battery;

wherein the heat release power $Q_{mix}$ satisfies a fourth formula:

$$Q_{mix} = \eta_{mix} \cdot \Delta H_{mix} \cdot \frac{dSOC}{dt}$$

wherein $\eta_{mix}$ represents an energy release efficiency of the cathode electrode and the anode electrode mixed contact reaction of the first power battery or the second power battery; $\Delta H_{mix}$ represents a total energy release of the cathode electrode and the anode electrode mixed contact reaction of the first power battery or the second power battery; SOC represents a state of charge of the first power battery or the second power battery; and $$\frac{dSOC}{dt}$$

represents a change rate of the state of charge of the first power battery or the second power battery;

wherein the change rate of the state $$\frac{dSOC}{dt}$$

satisfies a fifth formula:

$$\frac{dSOC}{dt} = \frac{1}{\Delta t} \cdot SOC, (T > T_{mix})$$

wherein $\Delta t$ represents a speed control of the energy release of the cathode electrode and the anode electrode mixed contact reaction of the first power battery or the second power battery.

5. The method of claim 4, wherein a relationship between the energy release efficiency $\eta_{mix}$ and the normalized concentration x of the cathode reaction materials or the anode reaction materials satisfies a formula:

$$\eta_{mix} = \min\{c_{an\_3\_100\%}, c_{ca\_2\_100\%}\}.$$

6. The method of claim 4, wherein a relationship between the heat release efficiency rx and the state of charge SOC satisfies a formula:

$$\eta_x = SOC/100\%.$$

7. The method of claim 1, further comprising when the maximum temperature $T_{max}$ is greater than the threshold temperature $T_{threshold}$, changing the materials of the first power battery so that the maximum temperature $T_{max}$ is less than or equal to the threshold temperature $T_{threshold}$.

8. The method of claim 1, wherein the selected first power batteries have a plurality of maximum temperature rise $\Delta T$;
selecting the minimum of the plurality of maximum temperature rise $\Delta T$ of the selected first power batteries; and
assembling a full battery comprising the selected first power batteries that has the minimum of the plurality of maximum temperature rise $\Delta T$, to prevent or mitigate thermal runaway.

9. The method of claim 1, wherein a cathode material of the cathode electrode plate and an anode material of the anode electrode plate of each of the plurality second power batteries are selected according to the formula:

$$SE_{cell} = \frac{SC_{ca}}{m_{an}/m_{ca} + 1} \times V_{rate} \times \zeta_{act} \times \eta_{act}$$

wherein $SE_{cell}$ represents a specific energy of each of the plurality second power batteries, $SC_{ca}$ represents a specific capacity of the cathode material of the cathode electrode plate, $m_{an}$ represents a mass of the anode material, $m_{ca}$ represents a mass of the cathode material, $V_{rate}$ represents a design nominal voltage of each of the plurality second power batteries, $\zeta_{act}$ represents a mass percentage between an active material of the cathode material and each of the plurality second power batteries, and $\eta_{act}$ represents an average utilization of the active material of the cathode material.

10. The method of claim 9, wherein the total capacity of the anode electrode plate is defined as $C_{an}$, and $C_{an} = SC_{an} \cdot m_{an}$; the total capacity of the cathode electrode plate is defined as $C_{ca}$, and $C_{ca} = SC_{ca} \cdot m_{ca}$; a ratio $\kappa$ between the total capacity $C_{an}$ of the anode electrode plate and the total capacity $C_{ca}$ of the cathode electrode plate is greater than 1; wherein $SC_{an}$ represents a specific capacity of the anode material of the anode electrode plate.

11. The method of claim 10, wherein the ratio $\kappa$ is in a range from about 1.05 to about 1.2.

12. The method of claim 1, wherein the performing the differential scanning calorimetry test on each of the plurality of testing component materials comprises:
obtaining N groups of differential scanning calorimetry test results by performing differential scanning calorimetry tests N times at different constant temperature rise scanning rates on each of the plurality of testing component materials, wherein N is a positive integer greater than or equal to 5; and
obtaining the thermal runaway reaction and the plurality of parameters of the thermal runaway reaction of each of the plurality of testing component materials by the N groups of differential scanning calorimetry test results.

13. The method of claim 1, wherein the first power battery comprises a first cathode electrode and a first anode electrode, the self heat generation onset temperature $T_0$ is an onset temperature $T_{mix}$ of the first cathode electrode and the first anode electrode mixed contact reaction of the first power battery, and the onset temperature $T_{mix}$ of the first cathode electrode and the first anode electrode mixed contact reaction is above 480° C., the maximum temperature $T_{max}$ of the first power battery is stable at about 500° C., and the maximum temperature rise $\Delta T$ of the first power battery is stable at about 410° C.

14. A method for making a full battery, comprising:
assembling a plurality of power batteries, each of the plurality of power batteries comprises a plurality of component materials, and the plurality of component materials comprises a cathode electrode plate, an anode electrode plate, a separator, and an electrolyte;
performing a charging test and a discharging test on each of the plurality of power batteries;
obtaining a plurality of testing component materials by disassembling some of the plurality of power batteries in a fully charged state and disassembling others of the plurality of power batteries in a completely discharged state, wherein the plurality of testing component materials comprises a fully charged cathode electrode plate, a completely discharged cathode electrode plate, a fully charged anode electrode plate, a completely discharged anode electrode plate, the separator, and the electrolyte;
obtaining a thermal runaway reaction and a plurality of parameters of the thermal runaway reaction of each of the plurality of testing component materials by performing a differential scanning calorimetry test on each of the plurality of testing component materials;
establishing a thermal runaway reaction kinetic model according to a reaction kinetics equation, a mass conservation equation, a energy conservation equation, and the plurality of parameters of the thermal runaway reaction, wherein the thermal runaway reaction kinetic model satisfies a formula:

$$T = \int_t \frac{dT}{dt} dt + T_0$$

wherein T represents a temperature of the power battery, $T_0$ represents a self heat generation onset temperature of the power battery, $T_0$ is equal to a minimum of onset temperatures $T_{onset,x}$ of all the thermal runaway reactions, and $$\frac{dT}{dt}$$

represents a temperature rise rate of the power battery;
calculating a maximum temperature $T_{max}$ of thermal runaway of each of the plurality of power batteries based on the thermal runaway reaction kinetic model by a computer,
determining the thermal runaway safety of the power battery by comparing the maximum temperature $T_{max}$ of thermal runaway of the power battery with a threshold temperature $T_{threshold}$;

selecting some of the plurality of power batteries which have the maximum temperature $T_{max}$ less than or equal to the threshold temperature $T_{threshold}$ as selected power batteries; and assembling a full battery comprising the selected power batteries to prevent or mitigate thermal runaway.

15. The method of claim 14, wherein a cathode material of the cathode electrode plate and an anode material of the anode electrode plate of each of the plurality power batteries are selected according to the formula:

$$SE_{cell} = \frac{SC_{ca}}{m_{an}/m_{ca} + 1} \times V_{rate} \times \zeta_{act} \times \eta_{act}$$

wherein $SE_{cell}$ represents a specific energy of each of the plurality power batteries, $SC_{ca}$ represents a specific capacity of the cathode material of the cathode electrode plate, $m_{an}$ represents a mass of the anode material, $m_{ca}$ represents a mass of the cathode material, $V_{rate}$ represents a design nominal voltage of each of the plurality power batteries, $\zeta_{act}$ represents a mass percentage between an active material of the cathode material and each of the plurality power batteries, and $\eta_{act}$ represents an average utilization of the active material of the cathode material.

16. The method of claim 15, wherein the total capacity of the anode electrode plate is defined as $C_{an}$, and $C_{an} = SC_{ca} \cdot m_{an}$; the total capacity of the cathode electrode plate is defined as $C_{ca}$, and $C_{ca} = SC_{ca} \cdot m_{ca}$; a ratio κ between the total capacity $C_{an}$ of the anode electrode plate and the total capacity $C_{ca}$ of the cathode electrode plate is greater than 1; wherein $SC_{an}$ represents a specific capacity of the anode material of the anode electrode plate.

17. The method of claim 16, wherein the ratio κ is in a range from about 1.05 to about 1.2.

18. The method of claim 14, wherein the performing the differential scanning calorimetry test on each of the plurality of testing component materials comprises:

obtaining N groups of differential scanning calorimetry test results by performing differential scanning calorimetry tests N times at different constant temperature rise scanning rates on each of the plurality of testing component materials, wherein N is a positive integer greater than or equal to 5; and obtaining the thermal runaway reaction and the plurality of parameters of the thermal runaway reaction of each of the plurality of testing component materials by the N groups of differential scanning calorimetry test results.

19. The method of claim 14, wherein the self heat generation onset temperature $T_0$ is an onset temperature $T_{mix}$ of the cathode electrode and the anode electrode mixed contact reaction of the power battery, and the onset temperature $T_{mix}$ of the cathode electrode and the anode electrode mixed contact reaction is above 480° C., the maximum temperature $T_{max}$ of the power battery is stable at about 500° C., and the maximum temperature rise ΔT of the power battery is stable at about 410° C.

20. The method of claim 14, further comprising changing materials of the rest of the plurality of power batteries which have the maximum temperature $T_{max}$ greater than the threshold temperature $T_{threshold}$, so that the maximum temperature $T_{max}$ of the rest of the plurality of power batteries is less than or equal to the threshold temperature $T_{threshold}$.

* * * * *